(12) United States Patent
Numata et al.

(10) Patent No.: US 10,948,659 B2
(45) Date of Patent: Mar. 16, 2021

(54) INTEGRATED OPTOELECTRONIC CHIP AND LENS ARRAY

(71) Applicant: INTERNATIONAL BUSINESS MACHINES CORPORATION, Armonk, NY (US)

(72) Inventors: Hidetoshi Numata, Kawasaki (JP); Masao Tokunari, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/364,877

(22) Filed: Mar. 26, 2019

(65) Prior Publication Data

US 2019/0219768 A1 Jul. 18, 2019

Related U.S. Application Data

(62) Division of application No. 15/865,667, filed on Jan. 9, 2018, now Pat. No. 10,310,187, which is a division of application No. 15/402,735, filed on Jan. 10, 2017, now Pat. No. 10,222,555.

(51) Int. Cl.
*G02B 6/32* (2006.01)
*G02B 6/42* (2006.01)

(52) U.S. Cl.
CPC .............. *G02B 6/32* (2013.01); *G02B 6/425* (2013.01); *G02B 6/4206* (2013.01); *G02B 6/428* (2013.01); *G02B 6/4214* (2013.01); *G02B 6/4244* (2013.01); *G02B 6/4246* (2013.01); *G02B 6/4249* (2013.01)

(58) Field of Classification Search
CPC ............. G02B 6/32; G02B 6/42; G02B 6/428

USPC .......................................................... 385/33
See application file for complete search history.

(56) References Cited

U.S. PATENT DOCUMENTS

| 5,617,131 A * | 4/1997 | Murano .................. B41J 2/451 347/233 |
| 5,808,784 A * | 9/1998 | Ando ................... G02B 3/0031 359/400 |
| 6,640,021 B2 | 10/2003 | Pogge et al. |

(Continued)

OTHER PUBLICATIONS

List of IBM Patents or Patent Applications Treated as Related dated Mar. 26, 2019, 2 pages.

(Continued)

*Primary Examiner* — Kaveh C Kianni
(74) *Attorney, Agent, or Firm* — Tutunjian & Bitetto, P.C.; Randall Bluestone

(57) ABSTRACT

Optoelectronic coupling systems include an optoelectronic chip mounted on a substrate. The optoelectronic chip has one or more optoelectronic components. An integrated circuit chip is mounted on the substrate in communication with the optoelectronic chip via one or more wires. A lower lens array is positioned over the optoelectronic chip. A lower surface of the lower lens array has a first cut-away portion to accommodate the optoelectronic chip and a second cut-away portion to accommodate the one or more wires. An upper surface of the lower lens array has one or more lower lenses positioned over respective optoelectronic components. An upper lens array is positioned over the lower lens array and has one or more upper lenses positioned over respective lower lenses.

19 Claims, 7 Drawing Sheets

(56) References Cited

U.S. PATENT DOCUMENTS

| | | | |
|---|---|---|---|
| 7,061,949 B1* | 6/2006 | Zhou | H01S 5/02296 372/36 |
| 7,830,945 B2* | 11/2010 | Nagano | G02B 6/4206 372/101 |
| 7,883,277 B2 | 2/2011 | Budd et al. | |
| 8,871,570 B2 | 10/2014 | Levy et al. | |
| 9,063,313 B1 | 6/2015 | Hasharoni | |
| 9,229,169 B2* | 1/2016 | Doany | G02B 6/32 |
| 9,285,554 B2 | 3/2016 | Doany et al. | |
| 9,684,128 B2 | 6/2017 | Pinguet et al. | |
| 2001/0030805 A1* | 10/2001 | Sawaki | G02B 3/005 359/453 |
| 2002/0076151 A1* | 6/2002 | Kinard | G02B 6/32 385/33 |
| 2002/0097957 A1* | 7/2002 | Kikuchi | G02B 6/327 385/33 |
| 2003/0113077 A1 | 6/2003 | Xu et al. | |
| 2003/0147254 A1* | 8/2003 | Yoneda | G01B 11/00 362/551 |
| 2005/0185900 A1* | 8/2005 | Farr | G02B 6/4206 385/93 |
| 2006/0239605 A1* | 10/2006 | Palen | G02B 6/4206 385/14 |
| 2007/0206908 A1 | 9/2007 | Cohen et al. | |
| 2008/0260331 A1* | 10/2008 | Takeda | G02B 6/29361 385/33 |
| 2009/0174947 A1* | 7/2009 | Hasegawa | B32B 38/0004 359/642 |
| 2011/0038044 A1* | 2/2011 | Kim | G02B 27/2214 359/463 |
| 2011/0057204 A1* | 3/2011 | Morioka | G02B 6/4214 257/84 |
| 2012/0002284 A1* | 1/2012 | McColloch | G02B 6/4206 359/558 |
| 2012/0057362 A1* | 3/2012 | Fritz | B60Q 1/2665 362/494 |
| 2012/0183009 A1* | 7/2012 | Adachi | G02B 6/4214 372/99 |
| 2012/0228481 A1* | 9/2012 | Tanaka | H01L 31/0524 250/214.1 |
| 2012/0251045 A1* | 10/2012 | Budd | G02B 13/22 385/33 |
| 2012/0263416 A1* | 10/2012 | Morioka | G02B 6/4214 385/33 |
| 2013/0168537 A1* | 7/2013 | Shin | G02B 6/4206 250/216 |
| 2013/0194676 A1* | 8/2013 | Sannokyou | C03B 11/08 359/642 |
| 2013/0242401 A1* | 9/2013 | Shibuya | B29C 45/0025 359/627 |
| 2013/0259419 A1* | 10/2013 | Charbonneau-Lefort | G02B 6/4214 385/14 |
| 2013/0259423 A1* | 10/2013 | Charbonneau-Lefort | G02B 6/4206 385/33 |
| 2013/0259431 A1* | 10/2013 | Charbonneau-Lefort | G02B 6/4214 385/89 |
| 2013/0266260 A1* | 10/2013 | Morioka | G02B 6/4214 385/33 |
| 2014/0099058 A1* | 4/2014 | Charbonneau-Lefort | G02B 6/4214 385/33 |
| 2014/0153872 A1* | 6/2014 | Lin | G02B 6/42 385/33 |
| 2014/0199022 A1* | 7/2014 | Kuo | G02B 6/4214 385/33 |
| 2014/0212086 A1* | 7/2014 | Sunaga | G02B 6/428 385/14 |
| 2014/0270662 A1* | 9/2014 | Morioka | G02B 6/4214 385/93 |
| 2015/0010273 A1* | 1/2015 | Oyagi | G02B 6/428 385/33 |
| 2015/0205058 A1* | 7/2015 | Kuo | G02B 6/425 250/227.24 |
| 2015/0234135 A1* | 8/2015 | Kanke | G02B 6/4214 385/33 |
| 2015/0268425 A1* | 9/2015 | de Jong | G02B 6/4214 385/33 |
| 2016/0170218 A1* | 6/2016 | Johnson | G02B 6/32 359/356 |
| 2017/0141533 A1* | 5/2017 | Caer | H01S 5/0261 |
| 2017/0371114 A1* | 12/2017 | Mentovich | G02B 6/4243 |
| 2018/0108697 A1* | 4/2018 | Matsugai | H01L 27/14627 |

OTHER PUBLICATIONS

Masao Tokunari, Assembly optimization for low power optical MCM link, CPMT Symposium Japan, Nov. 9-11, 2015, pp. 166-169.

Hak-Soon Lee, Ribbon plastic optical fiber linked optical transmitter and receiver modules featuring a high alignment tolerance, Opt. Express 19, Feb. 2011, pp. 4301-4309.

Non Final Office Action and cited references for U.S. Appl. No. 15/865,667 dated Jun. 29, 2018 (14 pages).

* cited by examiner

INTEGRATED OPTOELECTRONIC CHIP AND LENS ARRAY

STATEMENT REGARDING FEDERALLY SPONSORED RESEARCH OR DEVELOPMENT

This invention was made with Government support under Contract No. 14102133-0 awarded by New Energy and Industrial Technology Development Organization (NEDO). The Government has certain rights in this invention.

BACKGROUND

Technical Field

The present invention generally relates to optoelectronic communications and, more particularly, to interfaces between optoelectronic devices and waveguides.

Description of the Related Art

An active optical flex is an optical module that uses flexible organic optical waveguides. Existing active optical flexes have, e.g., 48 channels with a high-density pitch of about 60.6 µm. However, these active optical flexes suffer from significant optical losses due to the propagation of light through a substrate. Even if the light propagates through air, instead of through a substrate, by placing an optoelectronic chip with an exposed active area and using wire bonding gaps to allow the optoelectronic chip to interface with, e.g., a driver chip, the wire gaps between the optoelectronic chip and the waveguides still result in optical loss. In an example with a gap of about 200 µm, the optical loss can be over 6 dB.

SUMMARY

An optoelectronic coupling system includes an optoelectronic chip mounted on a substrate. The optoelectronic chip includes one or more optoelectronic components. An integrated circuit chip is mounted on the substrate in communication with the optoelectronic chip via one or more wires. A lower lens array is positioned over the optoelectronic chip and has a lower surface that includes a first cut-away portion to accommodate the optoelectronic chip and a second cut-away portion to accommodate the one or more wires. The lower lens array has an upper surface with one or more lower lenses positioned over respective optoelectronic components. An upper lens array is positioned over the lower lens array comprising one or more upper lenses positioned over respective lower lenses.

An optoelectronic coupling system includes an optoelectronic chip mounted on a substrate. The optoelectronic chip has one or more optoelectronic components. An integrated circuit chip is mounted on the substrate in communication with the optoelectronic chip via one or more wires. A lower lens array is positioned over the optoelectronic chip. A lower surface of the lower lens array includes a first cut-away portion to accommodate the optoelectronic chip and a second cut-away portion to accommodate the one or more wires. An upper surface of the lower lens array includes one or more lower lenses positioned over respective optoelectronic components. An upper lens array is positioned over the lower lens array and has one or more upper lenses positioned over respective lower lenses. A light path between the one or more optoelectronic components and the waveguide passes through a free-space cavity between the upper and lower lenses. A waveguide is mounted on the upper lens array.

An optoelectronic coupling system includes an optoelectronic chip mounted on a substrate. The optoelectronic chip has one or more optoelectronic components. An integrated circuit chip is mounted on the substrate in communication with the optoelectronic chip via one or more wires. A lower lens array is positioned over the optoelectronic chip and has first alignment features. A lower surface of the lower lens array includes a first cut-away portion to accommodate the optoelectronic chip and a second cut-away portion to accommodate the one or more wires. An upper surface of the lower lens array has a lower lens cavity with one or more lower lenses positioned over respective optoelectronic components. An upper lens array is positioned over the lower lens array and has an upper lens cavity with one or more upper lenses positioned over respective lower lenses. The upper lens array has second alignment features configured to mate with the first alignment features. A light path between the one or more optoelectronic components and the waveguide passes through a free-space cavity between the upper and lower lenses. A waveguide is mounted on the upper lens array.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention fit a dual lens structure over an optoelectronic chip resting on, e.g., a flexible printed circuit board or rigid substrate. The dual lens structure provides relaxation of tolerance for a placement offset and reduction of optical loss. The dual lens structure has a cavity that accommodates the optoelectronic chip, with a hollow for wires, and uses curved lenses to collimate light to and from the optoelectronic chip and the waveguides.

Figure 1:
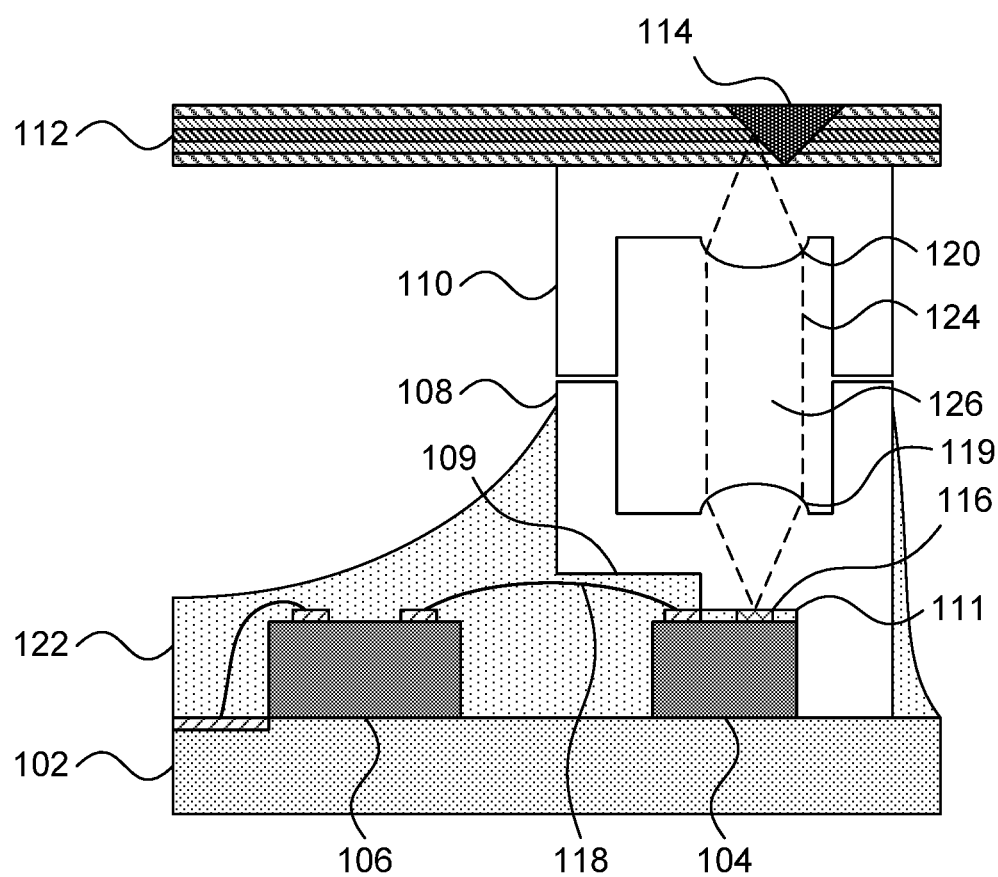
FIG. 1 is a diagram of an optoelectronic system in accordance with the present principles.

Referring now to FIG. 1, a cross-sectional view of a dual-lens optoelectronic chip coupling system is shown. An optoelectronic chip 104 and an integrated circuit (IC) chip 106 are formed on a substrate 102. It is specifically contemplated that the substrate 102 may be an organic substrate formed from, e.g., a resin, but it should be understood that any appropriate substrate material may be used instead, including, e.g., a semiconductor or dielectric material. The IC chip 106 is electrically connected to the optoelectronic chip 104 by way of one or more wires 118 and controls the operation of the optoelectronic chip 104. In one example, an IC chip 106 may operate as a driver for the optoelectronic chip 104 or may, alternatively, receive signals output by the optoelectronic chip 104.

A lower lens array 108 is positioned above the optoelectronic chip 104. In particular, the optoelectronic chip includes at least one optoelectronic device 116 that may include, for example, a vertical-cavity surface-emitting laser (VCSEL) or photodetector (PD). The lower lens array 108 is positioned over the optoelectronic chip 104 with a lens 119 over each optoelectronic device 116, such that a light path 124 from or to the optoelectronic device 116 is collimated (in the case of a VCSEL) or focused (in the case of a PD).

The lower lens array 108 has a lower surface that mounted on the surface of the substrate 102. The lower surface is cut away, with a first cut-away portion 111 being sized to accommodate the optoelectronic chip 104 and with a second cut-away portion 109 being sized to accommodate the wire(s) 118. It is specifically contemplated that the cut-away portions 109 and 111 may be sized to be larger than the space expected for the optoelectronic chip 104 and the wires 118, such that there is no contact between the lower lens array 108 and the optoelectronic chip 104. However, it should be understood that other embodiments may have cut-away portions that are sized to provide direct contact between the lower lens array 108 and the optoelectronic chip 104.

The lower lens array 108 is attached to the substrate 102 by, e.g., a transparent adhesive 122. The transparent adhesive 122 may furthermore adhere the optoelectronic chip 104 and the IC chip 106 to the substrate 102. The lower lens array 108 can be positioned on the substrate 102 manually or by a mounter. The transparent adhesive 122 may have a transmittance of greater than about 90% for the light wavelength between the optoelectronic chip 104 and the lower lens array 108 and may be any appropriate material that is curable under ultraviolet light or thermal effects.

An upper lens array 110 is positioned over the lower lens array 108. A second lens array is used to provide relaxation of tolerance for placement offset and optical loss reduction. Like the lower lens array 108, the upper lens array 110 includes a lens 120 positioned above each lens 119 of the lower lens array 108 and the respective optoelectronic devices 116. Together, lower lens array 108 and the upper lens array 110 define a cavity 126 (e.g., a free-space cavity or a cavity filled with some transmissive medium) through which the collimated light path 124 passes. It is specifically contemplated that the upper lens array 110 may be positioned on the lower lens array 108 using, e.g., an automatic mounter with a positioning accuracy of +5 µm. A total offset in the fitting of the lower lens array 108 to the substrate 102 and the upper lens array 110 to the lower lens array 108 of less than about 30 µm provides a coupling loss of less than about 0.5 dB. It should be noted that the upper lens array 110 and the lower lens array 108 may be formed by any appropriate process including, e.g., molding.

A waveguide 112 is attached to the upper lens array 110. The lenses 120 of the upper lens array 110 focus the light path 124 to, or collimate the light path 124 from, mirrors 114 in the waveguide 112. The waveguide 112 may be mounted on the upper lens array 110 using the transparent adhesive or by any other appropriate means. The light path 124 is reflected from the mirror 114 and into the waveguide core, to be propagated indefinitely.

In one specific embodiment, the distance between the OE device(s) 116 and the waveguide 112 is about 200 µm. In conventional systems, this separation would cause a coupling loss in excess of about 6 dB. In the present embodiments, however, the dual lens coupling system collimates the light path 124 for transit through free space in the cavity 126, substantially reducing the coupling losses. In addition, the coupling system provides a high-density arrangement. In one specific embodiment, four arrays of small lens components (e.g., about 6 mm by about 1.3 mm in size) produce a 48-channel array with a high-density 60.6 µm pitch.

Figure 2:
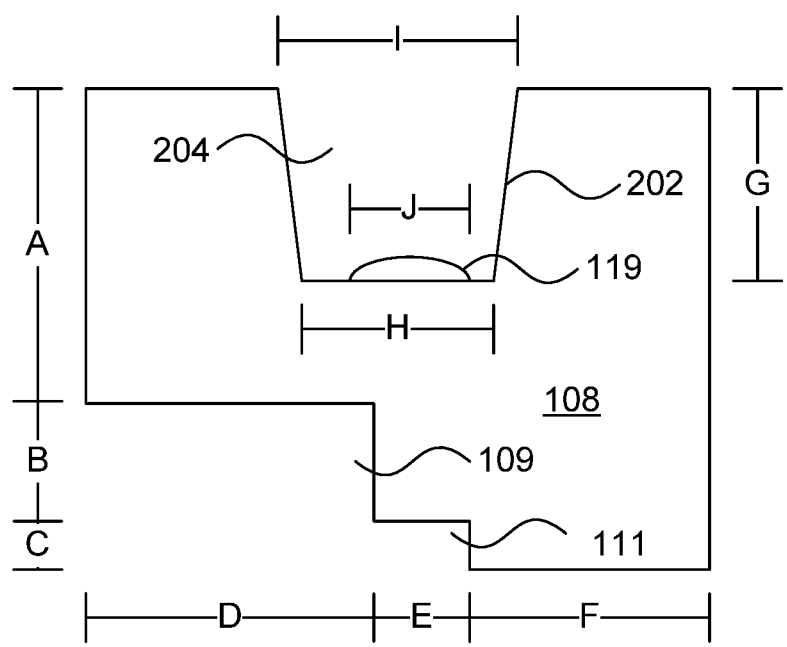
FIG. 2 is a cross-sectional diagram of a lower lens array in accordance with the present principles.

Referring now to FIG. 2, a more detailed cross-sectional view of a specific embodiment of the lower lens array 108 is shown. This illustrates a cross-section along the middle of the lower lens array 108, cutting through a lens 119. The various dimensions of this exemplary are provided in Table 1 below, but it should be understood that the present dimensions are provided for the sake of illustration only and may be modified in accordance with the particular design needs of an application. In particular, dimension C defines the height of the first cut-away portion 111 that accommodates the optoelectronic chip 104 and will be defined in accordance with an actual height of such a chip. Each of the relevant dimensions is labeled with a respective dimension identifier (e.g., A, B, C, . . . ) and has a corresponding length of the dimension in micrometers. In this specific embodiment, the lens 119 has an exemplary radius of curvature of about 173 µm. Table 1 includes all of the dimensions labeled for the lower lens array 108 and the upper lens array 110 across the present figures.

| Dimension identifier | Length (µm) |
| --- | --- |
| A | 650 |
| B | 250 |
| C | 100 |
| D | 595 |
| E | 197.5 |
| F | 507.5 |
| G | 400 |
| H | 400 |
| I | 500 |
| J | 250 |
| K | 6000 |
| L | 1300 |
| M | 700 |
| N | 500 |
| O | 3200 |
| P | 2985 |
| Q | 2785 |
| R | 595 |
| S | 507.5 |
| T | 285 |

It should be noted in particular that sides 202 of the lens cavity 204 are sloped and, further, it should be understood that these sloped sidewalls 202 represent only one embodiment—other configurations that include, for example, right-angle sidewalls or curved sidewalls may be used instead. It should further be understood that the lenses 119 need not be centered within the lens cavity 204, and may instead be positioned laterally displaced to be over the first cut-away portion 111, directly over respective optoelectronic devices 116.

Figure 3:
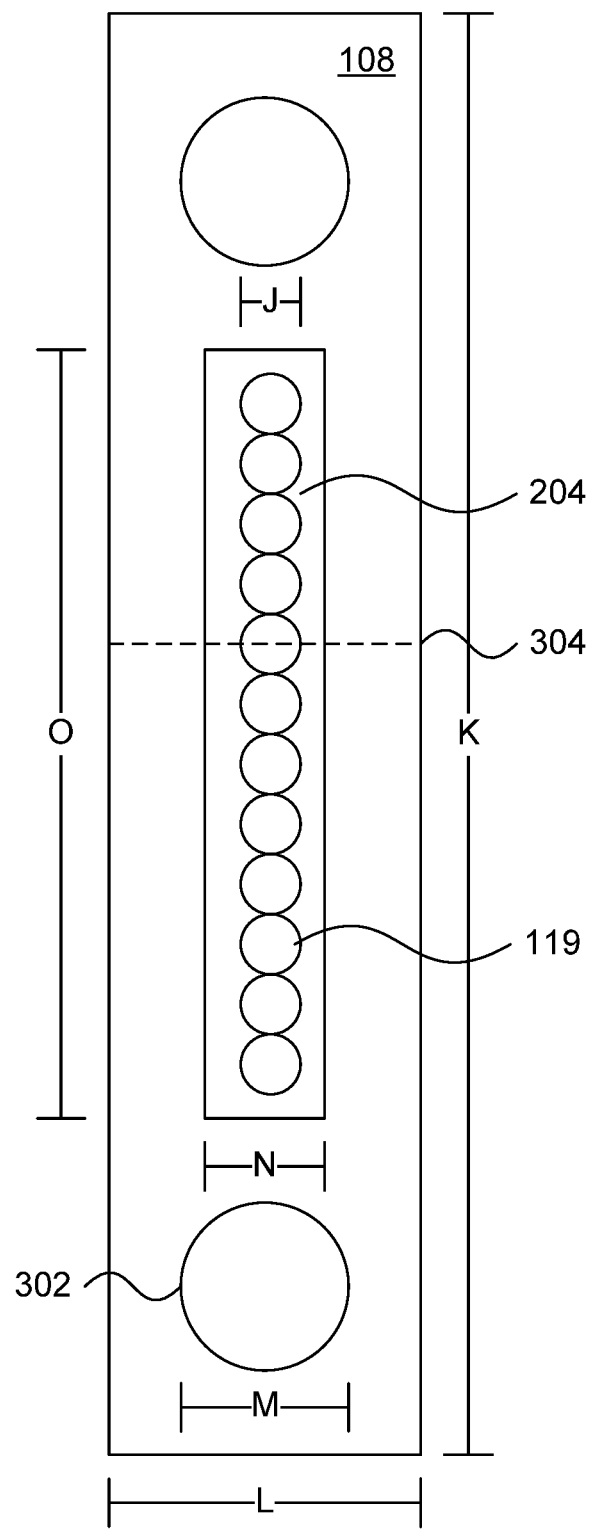
FIG. 3 is a top-down diagram of a lower lens array in accordance with the present principles.

Referring now to FIG. 3, a top-down view of the lower lens array 108 is shown. This view shows alignment features 302, which mate with corresponding alignment features on the upper lens array 110. As with the depiction of FIG. 2, various dimensions of one specific embodiment are labeled in Table 1 above.

The alignment features 302 may either be depressions or protrusions from the top surface of the lower lens array 108. In one embodiment, the alignment features 302 are either both depressions or both protrusions, while in another embodiment one alignment feature 302 is a depression and another alignment feature is a protrusion. In one specific embodiment, the depression/protrusion of alignment feature 302 may have a depth/height of about 600 µm. The cross-section 304 represents one of several possibilities for the location of the cross-section shown in FIG. 2.

As can be seen from this view, the lens cavity 204 includes multiple individual lenses 119. In this specific embodiment there are twelve lenses 119, corresponding to twelve respective optoelectronic devices 116, but it should be understood that any number of lenses 119 and any number of optoelectronic devices 116 may be used instead.

Figure 4:
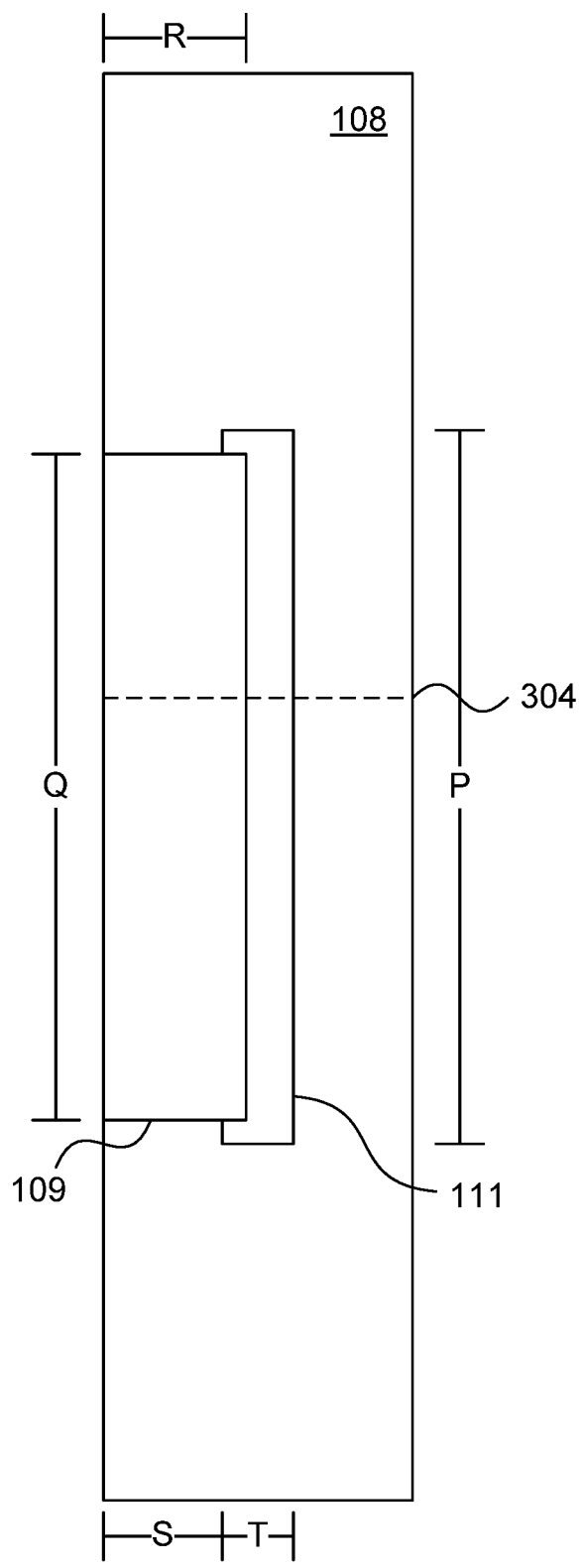
FIG. 4 is bottom-up diagram of a lower lens array in accordance with the present principles.

Referring now to FIG. 4, a bottom-up view of the lower lens array 108 is shown. This view shows the cut-away portions 111 and 109. In particular, the first cut-away portion 111 may have a length different from the length of the second cut-away portion 109, with the length of the first cut-away portion 111 in this example being greater than the length of the second cut-away portion 109. The labeled dimensions are listed above in Table 1.

Figure 5:
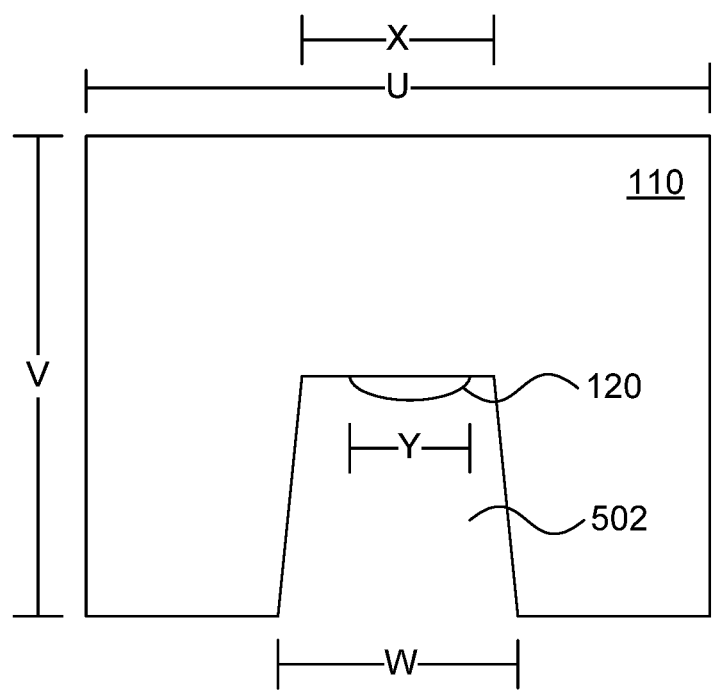
FIG. 5 is a cross-sectional diagram of an upper lens array in accordance with the present principles.

Referring now to FIG. 5, a more detailed cross-sectional view of a specific embodiment of the upper lens array 110 is shown. This illustrates a cross-section along the middle of the upper lens array 110, cutting through a lens 120. The various dimensions of this exemplary are provided in Table 1 above. In this specific embodiment, the lens 119 has an exemplary radius of curvature of about 173 µm. An upper lens cavity 502 is defined by a cut-away portion in the upper lens array 110, with sloped walls that are somewhat steeper than those of the lower lens cavity 204. The lens 120 is offset in the upper lens cavity 502 by the same amount as the lens 119 in the lower lens cavity 204.

Figure 6:
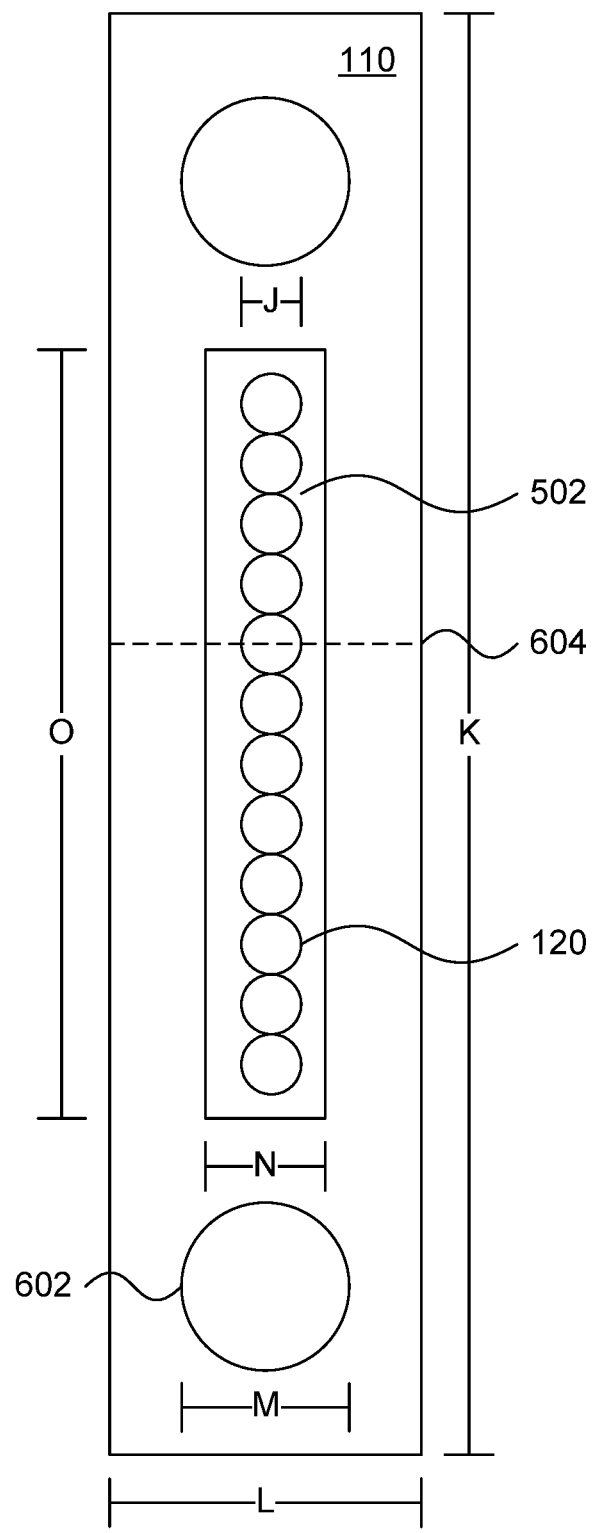
FIG. 6 is a bottom-up diagram of an upper lens array in accordance with the present principles.

Referring now to FIG. 6, a bottom-up view of the upper lens array 110 is shown. This view shows alignment features 602, which mate with corresponding alignment features 302 on the lower lens array 108. It should be noted that the dimensions generally match those of the lower lens array 108, to which the upper lens array 110 mates.

In particular, the alignment features 602 of the upper lens array 110 are inversions of the alignment features 302 of the lower lens array 108, where alignment features 302 that are depressions mate with alignment features 602 that are protrusions and where alignment features 302 that are protrusions mate with alignment features 602 that are depressions. The depth or height of the upper alignment features 602 will therefore match and invert the dimensions of the lower alignment features 302.

It is to be understood that aspects of the present invention will be described in terms of a given illustrative architecture; however, other architectures, structures, substrate materials and process features and steps can be varied within the scope of aspects of the present invention.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for an integrated circuit chip, which can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer can transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements can be included in the compound and still function in accordance with the present principles. The compounds with additional elements will be referred to herein as alloys.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Figure 7:
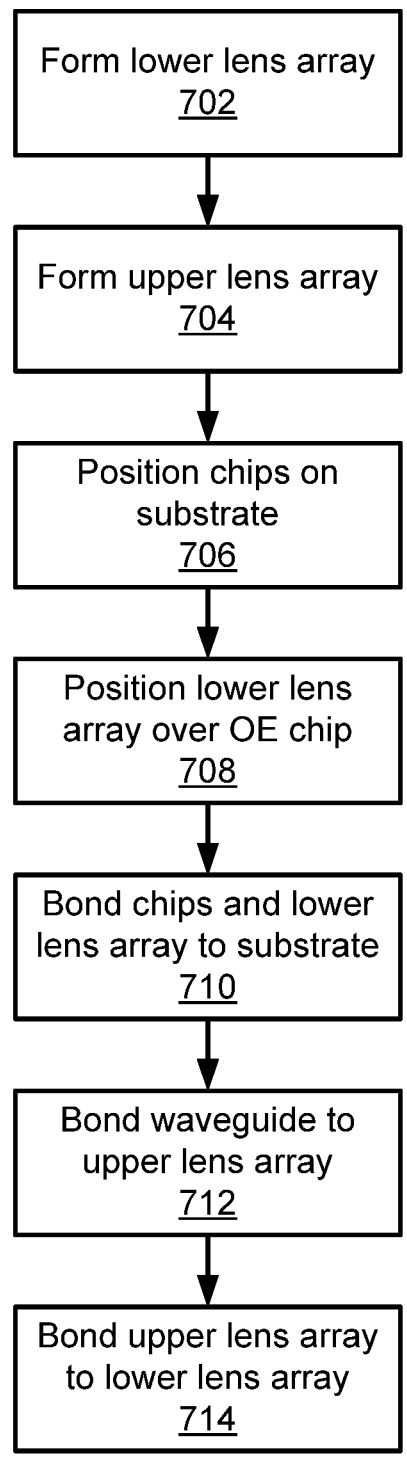
FIG. 7 is a block/flow diagram of a method for assembling an optoelectronic system in accordance with the present principles.

Referring now to FIG. 7, a method of forming an optical coupling system is shown. Block 702 forms a lower lens array, including first cut-away portion 111 to accommodate the optoelectronic chip 104, a second cut-away portion 109 to accommodate wires 118, the lower lens cavity 204, and lenses 119. Block 704 forms the upper lens array, with upper lens cavity 502 and lenses 120 by, e.g., molding.

Block 706 positions the optoelectronic chip 104 and the IC chip 106 on the substrate 102 by any appropriate mechanism (e.g., flip-chip bonding). Block 708 the positions the lower lens array 108 on the substrate 102 over the optoelectronic chip 104. As noted above, the lower lens array 108 may be positioned manually or by an automatic mounter. The optoelectronic chip 104, the IC chip 106, and the lower lens array 108 are bonded to the substrate 102 using transparent adhesive 122 in block 710. Block 712 bonds the waveguide 112 to the upper lens array 110 by, e.g., flip-chip bonding, with the upper lens array 110 being attached to the underside of the waveguide 112 by transparent adhesive which is dispensed and cured. Block 714 then mounts the upper lens array 110 onto the lower lens array 108, for example either manually of by a flip-chip process, with two upper alignment features on the upper lens array 110 being fitted to two lower alignment features of the lower lens array 108. The alignment features, which are not shown above, may include, e.g., respective bumps and recesses that mate.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An optoelectronic coupling system, comprising:
   an optoelectronic chip mounted on a substrate, the optoelectronic chip comprising one or more optoelectronic components;
   an integrated circuit chip mounted on the substrate in communication with the optoelectronic chip via one or more wires;
   a lower lens array positioned over the optoelectronic chip having a lower surface that comprises a first cut-away portion, that is cut away from the lower surface of the lower lens array, to accommodate the optoelectronic chip, and a second cut-away portion, that is cut away from the lower surface of the lower lens array, to accommodate the one or more wires, the lower lens array having an upper surface that comprises one or more lower lenses positioned over respective optoelectronic components; and
   an upper lens array positioned over the lower lens array comprising one or more upper lenses positioned over respective lower lenses.

2. The optoelectronic coupling system of claim 1, further comprising a waveguide mounted on the upper lens array.

3. The optoelectronic coupling system of claim 1, wherein a light path between the one or more optoelectronic components and the waveguide passes through a free-space cavity between the upper and lower lenses.

4. The optoelectronic coupling system of claim 1, wherein the lower lens array comprises first alignment features and the upper lens array comprises second alignment features configured to mate with the first alignment features.

5. The optoelectronic coupling system of claim 1, wherein the lower lenses are formed in a lower lens cavity and wherein the upper lenses are formed in an upper lens cavity.

6. The optoelectronic coupling system of claim 5, wherein the upper lens cavity and the lower lens cavities have sloped walls.

7. The optoelectronic system of claim 5, wherein the lower lenses are positioned off-center within the lower lens cavity.

8. The optoelectronic system of claim 5, wherein the lower lenses are positioned directly over the first cut-away portion and the optoelectronic chip.

9. The optoelectronic system of claim 5, wherein the upper lenses are positioned off-center within the upper lens cavity.

10. The optoelectronic system of claim 5, wherein the upper lenses are positioned directly over the first cut-away portion and the optoelectronic chip.

11. An optoelectronic coupling system, comprising:
    an optoelectronic chip mounted on a substrate, the optoelectronic chip comprising one or more optoelectronic components;

an integrated circuit chip mounted on the substrate in communication with the optoelectronic chip via one or more wires;

a lower lens array positioned over the optoelectronic chip having a lower surface that comprises a first cut-away portion, that is cut away from the lower surface of the lower lens array, to accommodate the optoelectronic chip, and a second cut-away portion, that is cut away from the lower surface of the lower lens array, to accommodate the one or more wires, the lower lens array having an upper surface that comprises one or more lower lenses positioned over respective optoelectronic components;

an upper lens array positioned over the lower lens array comprising one or more upper lenses positioned over respective lower lenses, wherein a light path between the one or more optoelectronic components and the waveguide passes through a free-space cavity between the upper and lower lenses; and a waveguide mounted on the upper lens array.

12. The optoelectronic coupling system of claim 11, wherein the lower lens array comprises first alignment features and the upper lens array comprises second alignment features configured to mate with the first alignment features.

13. The optoelectronic coupling system of claim 11, wherein the lower lenses are formed in a lower lens cavity and wherein the upper lenses are formed in an upper lens cavity.

14. The optoelectronic coupling system of claim 13, wherein the upper lens cavity and the lower lens cavities have sloped walls.

15. The optoelectronic system of claim 13, wherein the lower lenses are positioned off-center within the lower lens cavity.

16. The optoelectronic system of claim 13, wherein the lower lenses are positioned directly over the first cut-away portion and the optoelectronic chip.

17. The optoelectronic system of claim 13, wherein the upper lenses are positioned off-center within the upper lens cavity.

18. The optoelectronic system of claim 13, wherein the upper lenses are positioned directly over the first cut-away portion and the optoelectronic chip.

19. An optoelectronic coupling system, comprising:

an optoelectronic chip mounted on a substrate, the optoelectronic chip comprising one or more optoelectronic components;

an integrated circuit chip mounted on the substrate in communication with the optoelectronic chip via one or more wires;

a lower lens array, positioned over the optoelectronic chip and having first alignment features, with a lower surface that comprises a first cut-away portion to accommodate the optoelectronic chip and a second cut-away portion to accommodate the one or more wires, the lower lens array having an upper surface that comprises a lower lens cavity with one or more lower lenses positioned over respective optoelectronic components;

an upper lens array positioned over the lower lens array comprising an upper lens cavity with one or more upper lenses positioned over respective lower lenses and comprising second alignment features configured to mate with the first alignment features, wherein a light path between the one or more optoelectronic components and the waveguide passes through a free-space cavity between the upper and lower lenses; and a waveguide mounted on the upper lens array.

* * * * *